Figure 1:
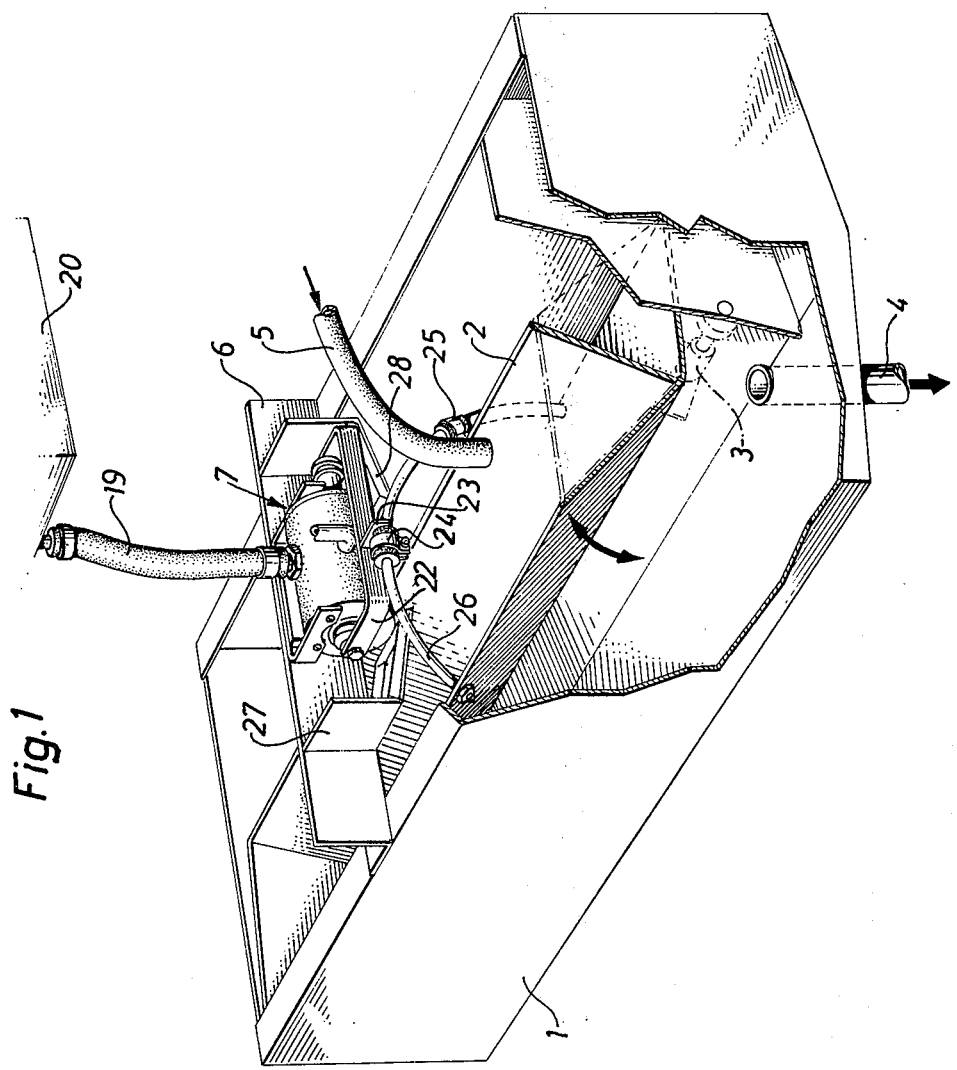

United States Patent
Lind

[11] 3,907,173
[45] Sept. 23, 1975

[54] METERING DEVICE

[75] Inventor: John Henric Lind, Solna, Sweden

[73] Assignee: Polypur Forsaljnings AB, Sundbyberg, Sweden

[22] Filed: Jan. 28, 1974

[21] Appl. No.: 437,521

[52] U.S. Cl. .................. 222/330; 137/99.5; 222/57; 222/361
[51] Int. Cl.² .................. G01F 11/10; G05D 11/02
[58] Field of Search ......... 137/98, 99, 99.5, 101.31; 210/519, 532; 73/198, 200, 422 TC, 422 GC; 222/57, 330, 361, 362, 363, 409, 222/426, 431, 444

[56] References Cited

UNITED STATES PATENTS

| | | | |
|---|---|---|---|
| 559,386 | 5/1896 | Jones | 222/361 |
| 1,735,390 | 11/1929 | Henderson | 222/361 |
| 3,064,481 | 11/1962 | Alexander | 73/422 TC |
| 3,403,827 | 10/1968 | Jahnes | 222/362 |
| 3,521,793 | 7/1970 | McShirley | 222/361 |
| 3,555,910 | 1/1971 | Spence et al. | 73/422 TC |
| 3,589,561 | 6/1971 | Davis | 222/57 |
| 3,751,992 | 8/1973 | Morgan | 73/422 GC |

Primary Examiner—Martin P. Schwadron
Assistant Examiner—George L. Walton
Attorney, Agent, or Firm—William J. Daniel

[57] ABSTRACT

A metering device for supplying predetermined amounts of fluid to a chamber, such as forms part of a water purification system, in which a housing is provided to receive the fluid to be metered and to continuously be at least partially filled with such fluid, the housing including two opposed sides penetrated by aligned openings for receiving for reciprocal movement between two limiting positions an elongated metering slide. The slide has a transverse cross-section substantially less than the housing interior and carries at least two separate non-communicating recesses which are spaced apart along the slide length a sufficient distance that the recesses are alternately moved between an interior fluid receiving position and an exterior fluid discharge position when the slide is reciprocated between its two limiting positions. Means are included for reciprocating the slide and for sealing the slide in relation to the housing openings.

5 Claims, 2 Drawing Figures

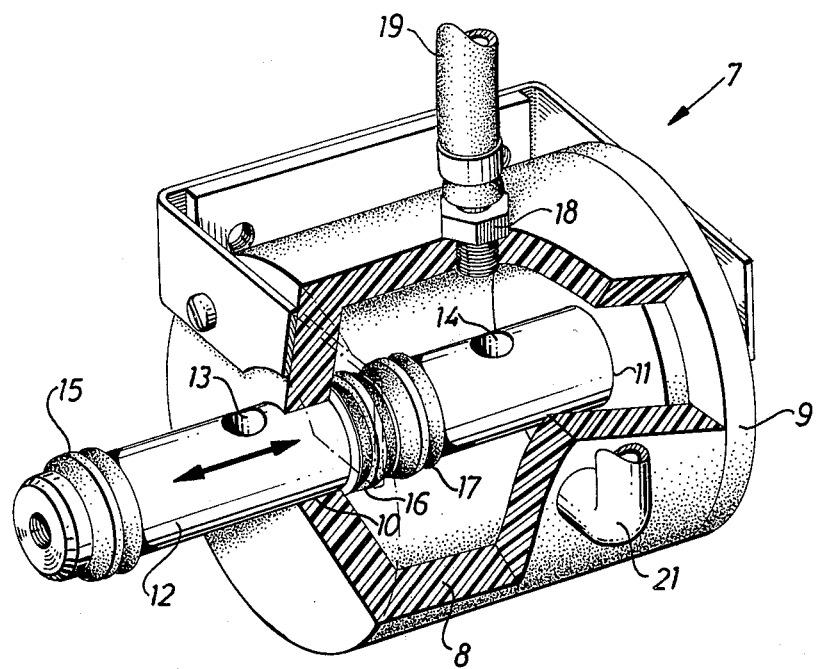

1

METERING DEVICE

The present invention relates to a metering device for alternatingly charging a predetermined amount of fluid to a container, which preferably forms part of a water purification system.

With water purification systems constructed for private houses, sport cabins, weekend cottages and like dwelling places, there is often used a sludge tank for separating sinking and floating contaminants from sewage produced in said dwelling places. Subsequent to this separation step, cleansed sewage water is then passed from the sludge tank to a chemical purification unit, which may be arranged in the sludge tank or in a container separate therefrom. The chemical purification unit may consist of a container having two chambers, to which the mechanically cleansed sewage water is alternatingly charged in a manner such that when one chamber is filled with water, which is admixed with a precipitating agent in said chamber, the other chamber is active in discharging water. Subsequent to a specific amount of water having been charged to the first mentioned chamber, said chamber discharges its contents, whereupon the other chamber is active to receive the sewage water and admix the same with the precipitating agent.

The devices previously suggested for charging precipitating agents to the aforementioned chambers do not operate satisfactorily. Neither do they charge a specific, predetermined quantity of precipitating agent to the chambers at each metering operation. Furthermore, the devices are complicated and often require hydraulic, pneumatic, electric or electromechanical activating means for their operation.

It is an object of the present invention to circumvent at least substantially the disadvantages encountered with prior art metering devices. This object is achieved with a metering device of the aforementioned type, which is mainly characterized by the fact that it comprises a housing having two opposed walls having openings disposed therein in which an elongate slide is arranged to be moved backwards and forwards by means of an activating means forming part of the water purification system; that the slide is provided with at least two openings and/or recesses arranged at such a distance apart that when the slide is activated to take one of two limit positions, one of the openings or recesses is moved from the interior of the housing, which is at least partially filled with fluid, to a position externally of the housing, to discharge the volume of fluid accommodated in the hole or recess, while the other hole or recess is moved from a position externally of the housing to the interior thereof.

So that the invention will be better understood and further features thereof made apparent, an embodiment of the invention will now be described with reference to the accompanying drawings, on which:

FIG. 1 is a perspective view of part of a chemical purifying unit for treating previously, mechanically purified sewage water, and FIG. 2 shows in perspective and in larger scale the metering device according to the invention intended for use with the chemical purifying unit shown in FIG. 1.

The part of the purifying unit shown in FIG. 1 comprises a box-like casing 1 in which a tiltable scoop 2 is pivotally mounted about a horizontal shaft 3. The tiltable scoop 2 is arranged for movement between two limit positions, of which one is shown in FIG. 1. At the bottom of the box 1 is a drainpipe 4, which is connected to a flocculating labyrinth or the like, not shown.

The previously, mechanically purified sewage water is introduced to the box 1 through an inlet pipe 5, the mouth of which lies vertically above the horizontal shaft 3 and slightly above the highest portion of the scoop 2, so that pivoting of the scoop between its two limit positions is not obstructed by the pipe.

Screwed to a holder 6, which is welded to the upper portion of the box 1, is a metering device 7 which includes a housing, preferably made of a hard plastics material and having the form of a cylindrical, sleeve-like body to which a cover 9 is attached in an appropriate manner (FIG. 2). Cylindrical holes 10 and 11 are arranged in the cover 9 and in the planar wall of the sleeve-like body located opposite the cover. A piston slide 12 is mounted for reciprocating movement in the holes 10 and 11. Located in the piston slide 12 are two holes 13 and 14 which are arranged to be alternatingly moved to a position externally of and within the housing 8. Four sealing rings, of which three 15, 16 and 17 are shown in FIG. 2, are detachably secured in three ring-shaped grooves in the slide 12. All the sealing rings are identical and each ring has the form of a rubber ring provided with a flange which diverges towards the wall of the housing 8 or the cover 9 against which it is intended to seal. When the slide 12 occupies the limit position shown to the left of FIG. 2, the flanged portion of the sealing ring 16 lies against the inner wall of the housing 8, and the flange of the sealing ring not shown in the Figure, said ring being attached to the right hand portion of the slide as seen in the drawing and being hidden by the cover 9, abuts the outer wall of the cover. When the slide 12 occupies its right hand limit position, the flange of sealing ring 15 abuts the outer wall of the housing 8 while the flange of the sealing ring 17 abuts the inner wall of the cover 9.

Arranged in the upper portion of the metering device 7 is a hole in which a nipple 18 is screwed. Attached to the nipple 18 is a hose 19, which at its other end is connected to a container 20 containing a liquid precipitating agent, such as an aqueous solution of aluminium sulphate. The container 20 is located above the metering device and the precipitating agent enclosed in the housing 8 exerts a certain pressure on the inner walls of said housing. One end of the nipple 21 communicates with the interior of the housing via a hole therein. The other end of the nipple 21 is connected to a suitable ventilating device.

The two legs of a stirrup-shaped member 22 are screwed into the two ends of the piston slide 12 (FIG. 1) and are provided with a projection 23 arranged to be engaged by two bushings 24 and 25 detachably screwed to an arcuate rod 26, which is screwed to the two outer walls of the tiltable scoop 2. The bushings 24 and 25 can be screwed securely to the rod 26 at any position therealong, thereby enabling the bushings to be adjusted so that the projection 23, and therewith the slide 12, can be caused to adopt their two limit positions at a pressure of the sealing rings 15–17 against the walls of the housing 8 and cover 9 of such magnitude as to provide a satisfactory seal when the tiltable scoop 2 occupies any one of its two limit positions. Pivoting of the tiltable scoop 2 to either of its limit positions ceases when the scoop engages suitable stop means (not shown) secured to the bottom of the box 1 or to the shaft 3.

When the tiltable scoop 3 occupies the limit position shown in FIG. 1, sewage water from pipe 5 can be charged to the left half of the scoop 2 as seen in the drawing. When a sufficient quantity of water has been collected in said scoop half, the scoop 2 is caused, by the weight of water therein, to pivot counter clockwise in FIG. 1 around the shaft 3 and to discharge the sewage water admixed with the precipitating agent to the bottom of the box 1 for continued passage to, for example, a flocculating labyrinth, via the drainpipe 4. At the end of this pivoting movement, the projection 23 on the stirrup-like member 22, and therewith the piston slide 12, is moved to the left by the bushing 25, whereupon the hole 13 of the slide is moved from the interior of the metering device 7 to the position shown in FIG. 2 and discharges precipitating agent to the righthand half of the scoop, which scoop half has now been swung to a position beneath the mouth of the inlet pipe 5, via a guide plate 27 attached to the holder 6. Subsequent to sewage water flowing in to the right-hand scoop half, the water is admixed in said scoop half with the quantity of fluid previously accommodated in opening 13 until the scoop 2 is pivoted clockwise, whereupon the right-hand scoop half discharges the sewage water admixed with precipitating agent to the bottom of the box 1. At the end of this pivoting movement of the scoop, the slide 12 is moved to the position shown to the right in FIG. 1, whereupon the hole 14 in the slide is moved to the right from the position shown in FIG. 2 to a position externally of the housing 8, so that the quantity of precipitating agent enclosed therein is discharged to the left-hand scoop half, via a guide plate 28, which is identical to the guide plate 27.

Although the invention has been described and illustrated with reference to one embodiment thereof, it will be understood that this embodiment can be modified within the scope of the invention. Thus, instead of one hole on opposite sides of the seal located between the holes, it is possible to arrange a number of holes and/or recesses in the slide, which holes and/or recesses may be arranged at a certain angle relative to each other. Further, it is possible to exclude certain of the seals and also to use a slide of non-circular cross section, for example a slide of rectangular cross section, or a slide of which certain portions are of hollow construction, instead of using a cylindrical, solid piston slide.

The invention is therefore only restricted by the scope of the accompanying claims.

I claim:

1. A metering device for alternatingly charging a predetermined quantity of fluid to a container, which preferably forms part of a water purification system, said device comprising a housing having two opposed walls having openings disposed therein; means for supplying the fluid to be metered to said housing to keep the housing at least partially filled with said fluid; an elongated slide arranged in fluid-tight relation in said opening in said housing walls for reciprocating movement relative to the housing between two limiting positions, said slide having a transverse cross-section substantially less than that of the interior of the housing and being provided with at least two separate, non-communicating recesses, said recesses being spaced such a distance apart that reciprocation of the slide between said two limiting positions alternately moves said recesses between a position within the interior of the housing at which the recess is filled with fluid to a position externally of the housing at which the recess empties fluid therein into said container; and means for reciprocating said slide between said positions.

2. A metering device according to claim 1 wherein the slide is provided with sealing means disposed when the slide is in either of the two limiting positions of the slide to sealingly abut at least one of the two opposing walls of the housing.

3. A metering device according to claim 2 wherein the sealing means are arranged on the slide on both sides of each of the recesses.

4. A metering device according to claim 1 wherein the slide comprises a solid cylinder and the recesses each comprise a hole passing therethrough.

5. A metering device according to claim 3 wherein for each of said recesses, said slide carries a separate sealing means outside and inside said housing and on opposite sides of the recess.

* * * * *